Oct. 23, 1951     E. R. ZIEGLER     2,572,295
CONTROLLER FOR ELECTRIC SYSTEMS
Filed March 20, 1947     5 Sheets-Sheet 1
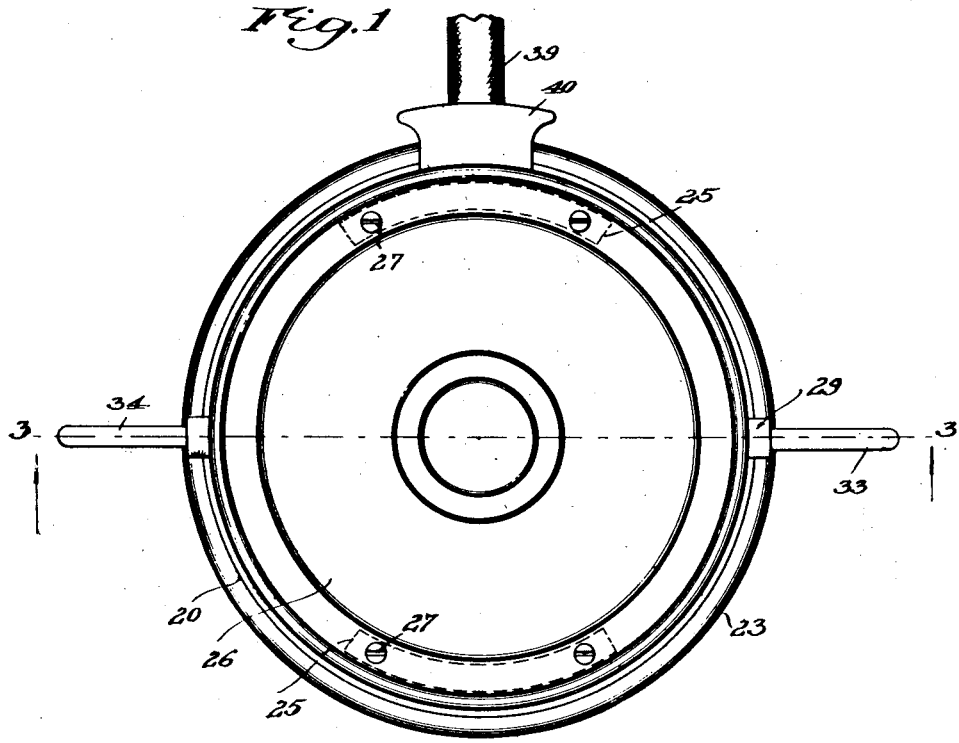
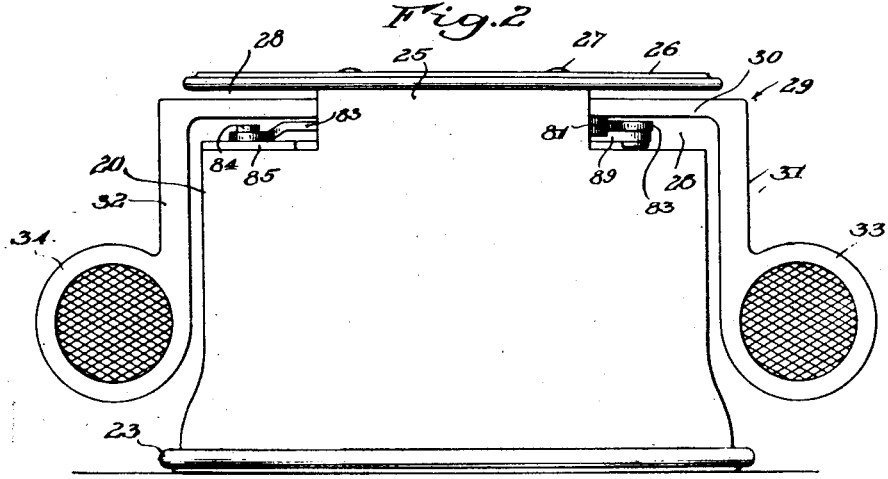
INVENTOR.
Eugene R. Ziegler
BY Edward H. Lumpston
his Attorney Oct. 23, 1951     E. R. ZIEGLER     2,572,295
CONTROLLER FOR ELECTRIC SYSTEMS
Filed March 20, 1947     5 Sheets-Sheet 2
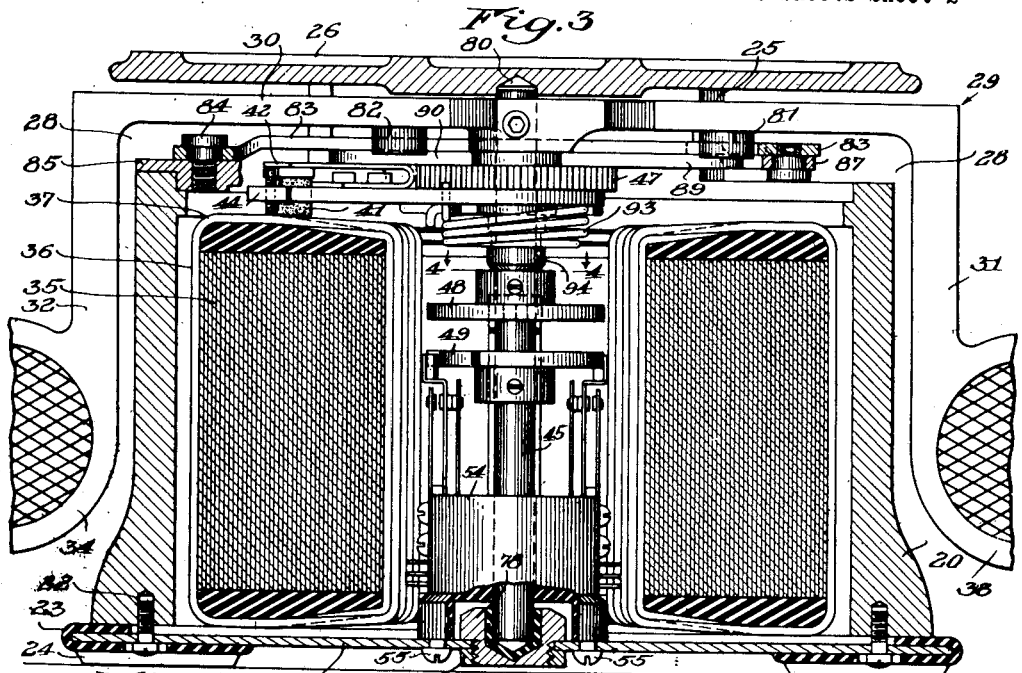
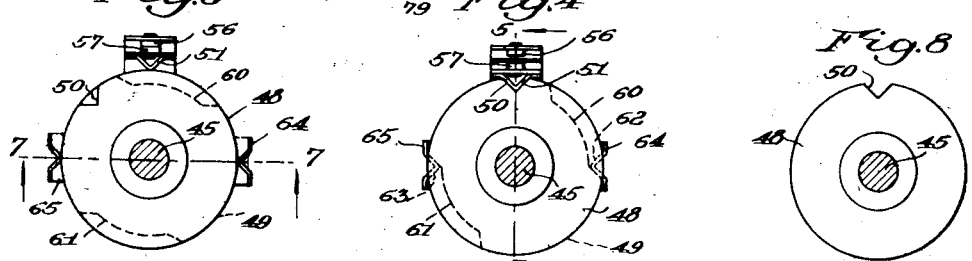
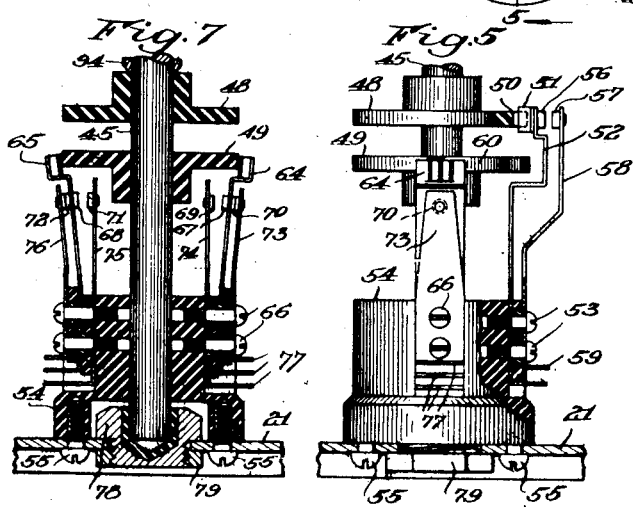
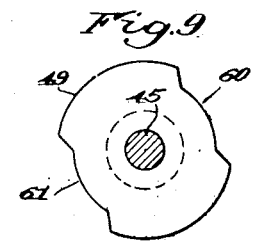
INVENTOR.
Eugene R. Ziegler
BY Edward H. Cumpston
his Attorney Oct. 23, 1951  E. R. ZIEGLER  2,572,295
CONTROLLER FOR ELECTRIC SYSTEMS
Filed March 20, 1947  5 Sheets-Sheet 3
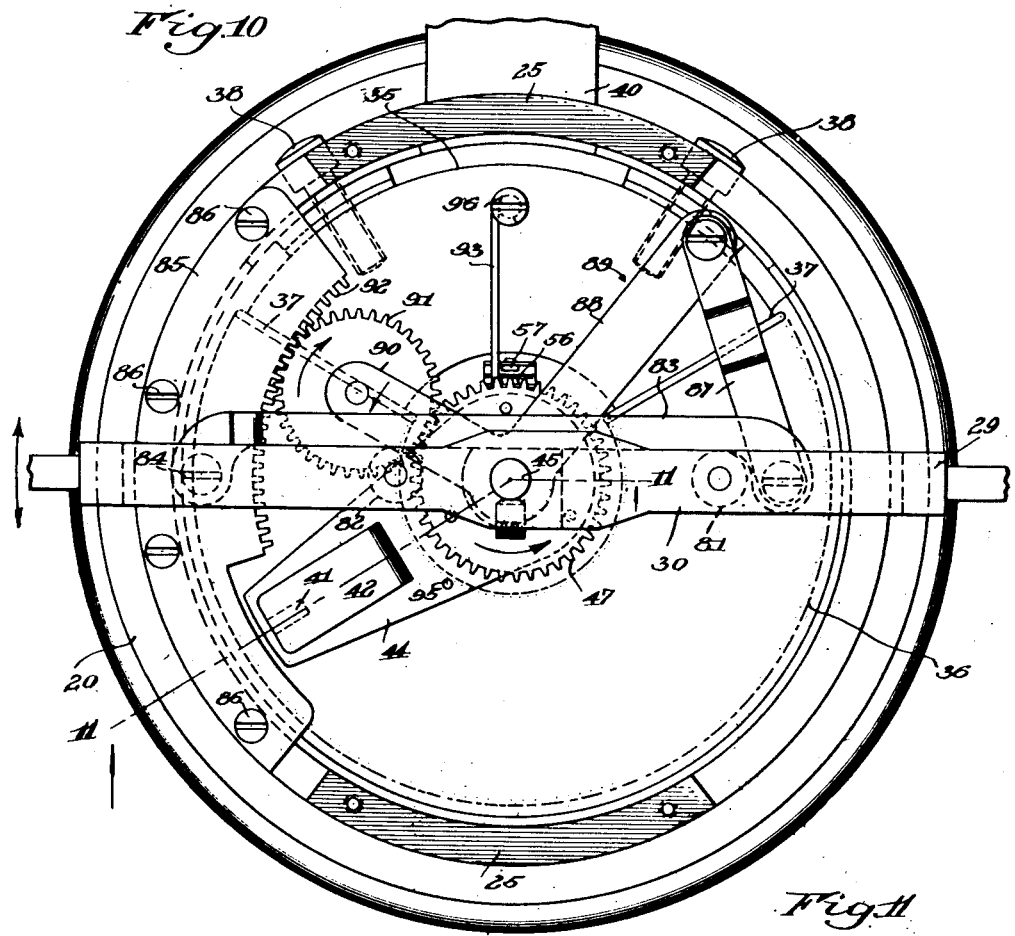
INVENTOR.
Eugene R. Ziegler
BY
Edward H. Cumpston
his Attorney

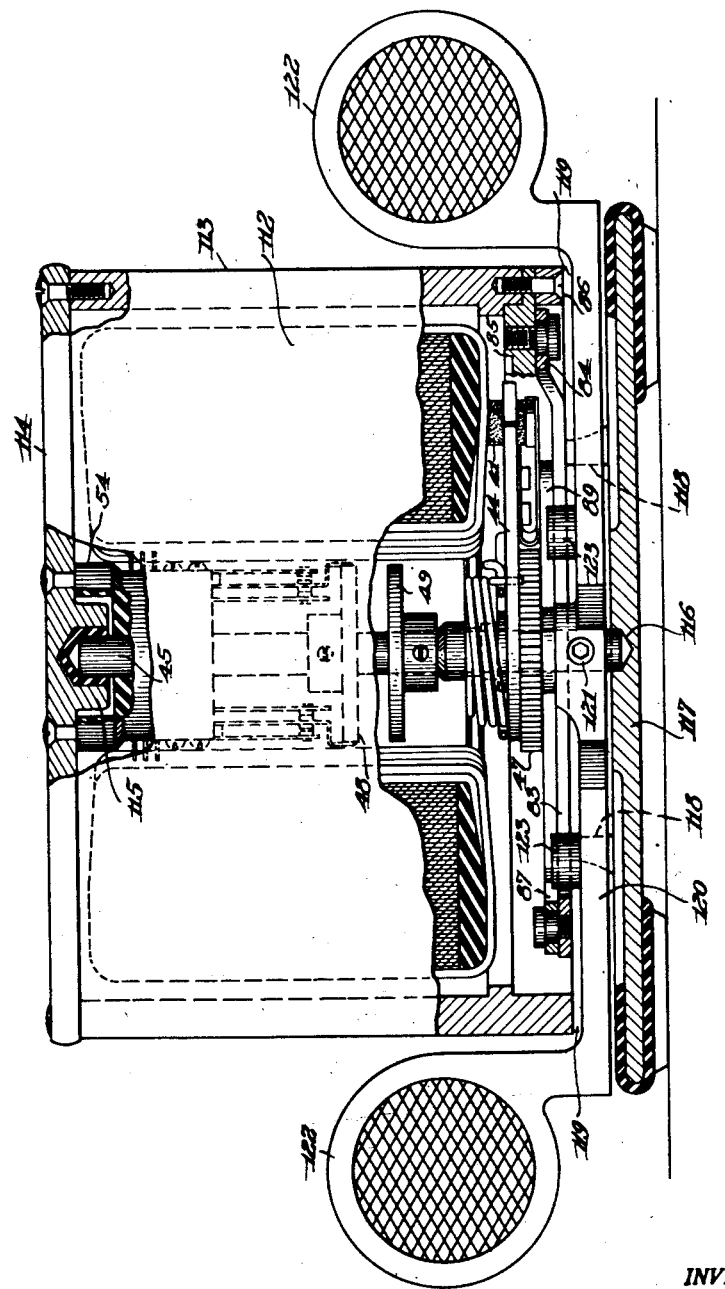

Patented Oct. 23, 1951

2,572,295

UNITED STATES PATENT OFFICE 2,572,295

CONTROLLER FOR ELECTRIC SYSTEMS

Eugene R. Ziegler, Spencerport, N. Y., assignor to Ritter Company, Inc., Rochester, N. Y., a corporation of Delaware Application March 20, 1947, Serial No. 736,031

13 Claims. (Cl. 200—17)

This invention relates to electrical controllers or switch means particularly adapted for controlling electric motors and other electric systems and particularly foot operated dental engine motors, one object of the invention being to provide an improved controller of the character indicated having a more simple, practical and efficient type of construction and mode of operation.

Another object is to provide such a device for controlling transformer and rectifier means for regulating the direction of rotation and speed of a motor, of the variety in which a foot pedal may be conviniently operated in either direction from a neutral position for effecting such motor control.

A further object is to provide a controller of the above nature comprising relatively few parts of a reliable and durable nature and mode of operation and capable of being manufactured, assembled and maintained in continuous operation at relatively low cost.

To these and other ends the invention resides in certain improvements and combinations of parts, all as will be hereinafter more fully described, the novel features being pointed out in the claims at the end of the specification.

In the drawings:

Fig. 1 is a top plan view of a controller device embodying the present invention;

Fig. 2 is a side elevation thereof;

Fig. 3 is an enlarged sectional elevation on the line 3—3 in Fig. 1;

Fig. 4 is a sectional plan view on the line 4—4 in Fig. 3, showing cam and switch means in the neutral or inactive position thereof;

Fig. 5 is a side elevation on the line 5—5 in Fig. 4, partly in section;

Fig. 6 is a view similar to Fig. 4, but showing the parts in one of the active positions thereof;

Fig. 7 is a sectional view on the line 7—7 in Fig. 6;

Fig. 8 is a view similar to Fig. 4 showing one of the cams detached from the switch means;

Fig. 9 is a view similar to Fig. 4 showing another of the cam means detached;

Fig. 10 is an enlarged top plan view of the controller with its cover plate removed and partly broken away, showing the parts in neutral or inactive position;

Fig. 11 is a sectional elevation of the line 11—11 in Fig. 10;

Fig. 12 is a sectional elevation on the line 12—12 in Fig. 11;

Fig. 13 is a sectional plan view on the line 13—13 in Fig. 11 as seen from below;

Fig. 16 is a view similar to Fig. 3 but showing a modified arrangement of the parts.

Figure 15:
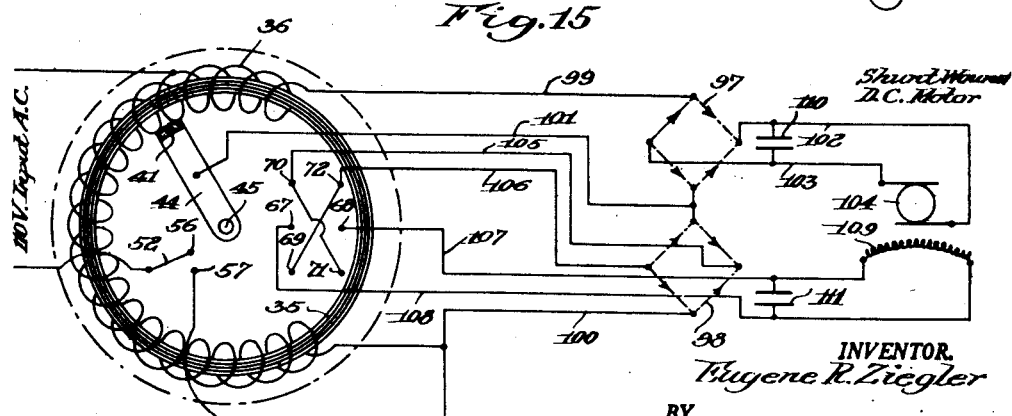
Fig. 15 is a diagrammatic view showing the circuit arrangement.

The invention is embodied in an apparatus comprising variable transformer and rectifier means and a controller for varying the ratio of transformation and the circuit connections, the general arrangement of the parts being as shown schematically in Fig. 15 of the drawings. By means of the controller and its variable transformer contact and switch means, the impressed voltage is applied with inversely varying ratios to a pair of bridge-type rectifiers, one of which is connected to the armature winding and the other to the field winding of the driven motor, with means actuated by the controller for reversing the direction of the current supplied to one of the motor windings to reverse its direction of operation. The controller, which will first be described, comprises a substantially cylindrical casing 20, resting on a bottom closure plate 21 secured thereto by means of screws 22 and having its peripheral portion encased in a rubber sheet 23 formed beneath the plate with cushioning pads 24. The top edge of casing 20 has arcuate shoulders 25 projecting upwardly at opposite sides thereof and supporting a cover plate 26 secured thereto as by means of screws 27. The opposite intervals or openings 28 between the shoulders afford clearance space for the control member or lever 29 having a horizontal intermediate portion 30 mounted in the casing for oscillating movement in opposite directions, as hereafter described. The opposite ends 31 and 32 of member 29 are turned downwardly and terminated by enlarged circular portions 33 and 34 for engagement by the foot of the operator, to press and oscillate the lever member in opposite directions, respectively.

The transformer means employed in the present instance is of the toroidal auto-transformer type, comprising a ring-shaped core 35, Figs. 3 and 10, on which is a single winding comprising conducting coils 36 the upper ends 37 of which form an arcuate series of stationary contacts, as well understood in the art, and although I prefer the single type of toroidal winding described and shown in the drawings, it is evident that the known types of transformers may be employed instead. The transformer is supported in spaced relation with the walls of the casing and bottom plate 21 by means of a pair of bolts 38 (Fig. 10), passed through the casing wall and into a portion of the transformer core between the ends of the winding 36. The input and output connections of the winding are led in a cable 39 (Fig. 1) through a sleeve 40 of insulating material projecting through the wall of the casing.

To provide for connection with points of the transformer winding of varying potential, the controller comprises, intermediate the usual secondary terminals, an adjustable secondary terminal in the form of a movable contact plug, 41 (Figs. 3 and 10 to 13, inclusive), made of carbon or other suitable material, fixed on one end of a resilient conducting strip 42 having its other end secured, as by screws 43, on the upper side of an arm 44 of insulating material mounted to rotate about an operating spindle 45, concentrically with the arcuate series of stationary contacts formed by the winding coils 37. Arm 44 is fixed, as by screws 46, to a gear 47 mounted to rotate on the spindle together with the arm. Means are provided, as hereafter described, for oscillating the gear and arm to oscillate the contact 44 over the winding contacts, to continuously vary the ratio of transformation and the current supplied to the direct current machine or motor to be controlled, as hereafter more fully described.

Switch means are provided in the controller for controlling the alternating current input and for reversing the direction of the direct current supplied to one of the windings of the driven machine, such switch means being actuated by the control spindle 45. To this end the spindle has fixed thereon a pair of cam disks, 48 and 49 (Figs. 8 and 9), for actuating the switch contacts. These disks are preferably made of insulating material and the upper disk 48 is employed to control a main switch included in the alternating current input circuit. For this purpose this disk is formed with a peripheral indentation, or notch 50, for cooperation with a V-shaped upper end 51 of a spring switch arm 52 fixed at its lower end, as by screws 53, on a tubular support 54 of insulating material secured by screws 55 on the bottom closure plate 21 of the casing. Switch arm 52 carries a contact 56 for engagement with a contact 57 on a spring arm 58 having its lower end fixed by screws 43 to the support 54, with suitable insulating material interposed between the switch arms and around the securing screws, the lower ends of the arms being turned outwardly as at 59 for the attachment of circuit connections. It is evident from the above construction that in the neutral position of spindle 45 and cam disk 48 shown in Figs. 4, 5 and 10, the switch arm 52 lies in the notch 50 of the disk, so as to separate the switch contacts 56 and 58 and open the primary circuit. In any other position of the cam disk, however, the V-shaped end 51 of the switch arm is forced out of the notch 50, thereby closing the contacts and the input circuit, as indicated in Fig. 6. These switch contacts, therefore, supply means for starting and stopping the driven machine.

Cam disk 49, for actuating the reversing switch of one of the secondary circuits, is formed with elongated peripheral depressions 60 and 61 (Fig. 9), for coaction with the V-shaped upper ends 62 and 63 of a pair of spring switch arms 64 and 65, respectively, generally similar to the switch arm 52 and similarly secured at their lower ends to the tubular support 54, as by screws 66. The switch arms 64 and 65 carry contacts, 67 and 68, respectively, each arranged to move between a pair of opposing contacts, 69 and 70, and 71 and 72, respectively, on short spring arms, 73 and 74, and 75 and 76, repectively, having their lower ends similarly fixed in insulating relation to the supporting sleeve 54, these switch arms being similarly provided with terminal portions, as 77.

It will be seen from the above construction that in the neutral position of spindle 45 and cam disk 49 (Fig. 4), the V-shaped upper ends of the switch arms, 64 and 65, lie in the depressions 60 and 61 of the disk, so as to engage contacts, 67 and 69 and 68 and 71, and that this relation of the contacts is maintained during oscillation of the spindle in a clockwise direction, as seen in Figs. 4 and 10. During oscillation of the spindle in the other direction from neutral position, switch arms 64 and 65 are cammed out of the depressions 60 and 61, so as to engage contacts 67 and 70 and 68 and 72, respectively, to reverse the direct current in the rectifier circuit connected with these switch arms, as indicated in the circuit diagram shown in Fig. 15.

Spindle 45 is rotatably supported at its lower end in a step bearing block 78 set in an opening in the center of the bottom closure plate 21 and clamped thereto by a nut 79, the bearing being lined with insulating material, as shown. The spindle passes loosely through switch supporting sleeve 54 and its upper end is supported in a bearing recess 80 (Fig. 3), formed in the under surface of the cover plate 26. Control lever 29 is fixed to the upper end of this spindle, as described above, and mechanism is provided between the lever and the arm 44 carrying the movable transformer contact 41, for oscillating the contact arm in the same direction during oscillation of the control lever in opposite directions, as will now be described.

Control lever 29 has fixed thereto, on each side of its supporting spindle 45, a depending abutment or roller, 81 and 82 (Figs. 3, 10 and 14) respectively, in position for engagement with the same adjacent side of a part or lever 83, pivoted at one end on a stud 84 in a bracket 85 fixed by screws 86 on the upper edge of the casing. This lever part 83 is thus pivoted at a point spaced from the pivotal support of control lever 29 on spindle 45, so as to swing laterally toward and from the pivot of the lever, and the opposite end of lever part 83 is pivotally connected to one end of a link 87, the other end of which is pivotally connected with one arm 88 of a bell crank lever 89 mounted to oscillate on spindle 45 between control lever 29 and gear 47. The bell crank lever has another normally extending arm 90, on which is rotatably mounted a pinion 91 meshing on one side with gear 47 and on the other with an arcuate rack 92 fixed to the casing bracket 85. A spring 93 (Figs. 11 and 13), is coiled about a sleeve 94 on spindle 45 between contact arm 44 and cam disk 48, one end of the spring being fixed to the contact arm at 95 and the other end to a screw 96 on the transformer core, the spring being arranged to rotate the arm and its associated gear 47 in a clockwise direction.

It is apparent from the above construction that as spring 93 rotates contact arm 44 toward one end of the winding and rotates gear 47 in a clockwise direction, pinion 91 rolls along rack 92 so as to swing bell crank lever 89 and lever part 83 in a clockwise direction, thereby pressing the side of lever 83 toward the abutment rollers 81 and 82 on control lever 29. The pressure of lever 83 against either one of the rollers 81 and 82 swings control lever 29 until the other of the rollers is also engaged with lever 83, so as to equalize its pressure and retain the parts in the neutral position shown in Fig. 10.

Figure 14:
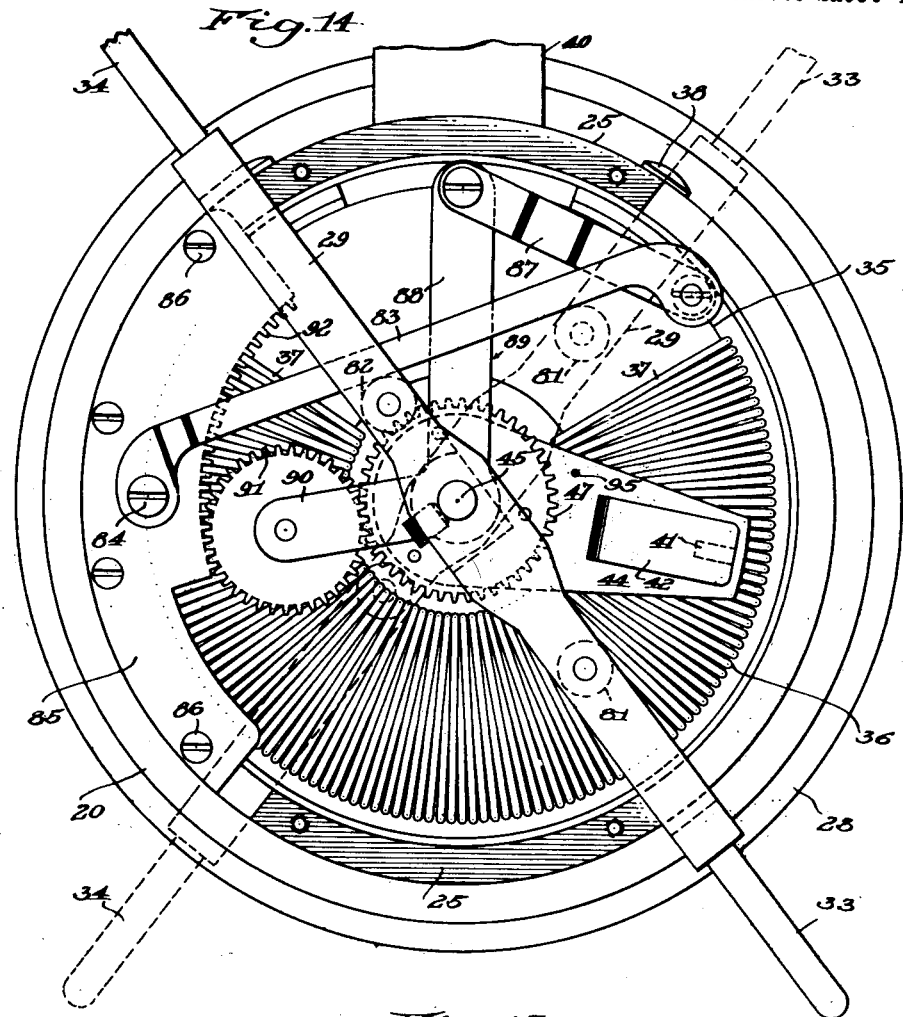
Fig. 14 is a view similar to Fig. 10, but showing different positions of the parts in full and dotted lines, respectively.

As control lever 29 is oscillated in either direction from this neutral position, one or the other of rollers 81 and 82 swings lever part 83 in a counterclockwise direction, rolling pinion 91 along the rack, turning the pinion in a clockwise direction, and the gear 47 in a counterclockwise direction, as indicated by the arrows (Fig. 10). Contact arm 44, fixed to the gear 47, is likewise swung in a counterclockwise direction toward the other end of the winding, so as to engage successive coils and points of different potential on the transformer winding and thus vary the voltage transmitted to the rectifying means of the system. It will be noted that roller 81, which is at a greater distance from the pivot 84 of the lever part 83 than roller 82, is also at a correspondingly greater distance from the pivot 45 of control lever 29 than the roller 82, these distances being selected to effect an equal throw of lever part 83 when control lever 29 is moved the same distance in either direction. As a result, the contact arm 44 is also moved the same distance in the same direction during equal movements of control lever 29 in opposite directions, so as to afford equal variations in speed for equal movements of the control lever in whichever direction the direct current machine is being driven. This is illustrated in Fig. 14 where the control lever is shown in full lines after movement in one direction and in dotted lines after an equal movement in the opposite direction, with resulting movement of lever part 83 and contact arm 44 through the same distance and in the same direction to the position shown in full lines. Upon release after movement in either direction, spring 93 returns arm 44 and its contact 41 to initial position adjacent one end of the winding with the parts in the initial or neutral position shown in Fig. 10.

As the control lever 29 is swung from neutral position in either direction, the switch contacts 56 and 57 are closed, as described above, to close the input circuit. When the control lever is swung in one direction, the reversing switch contacts 67 and 68 are moved to circulate the current in one direction from one of the rectifying means, to the driven machine, while movement of the control lever in the opposite direction effects an opposite actuation of the reversing switch to circulate the current in the opposite direction.

The controller mechanism described above is preferably employed with a pair of bridge-type rectifiers, indicated schematically at 97 and 98 in the circuit diagram shown in Fig. 15. One terminal of each of these rectifiers is connected, as at 99 and 100, to one of the end terminals of the transformer winding and the other or opposite terminals of the rectifiers are connected, as at 101, with the movable transformer contact 41, so as to continuously increase the current supplied to the rectifier 97 and decrease the current supplied to the rectifier 98 as the control lever is moved in either direction. Rectifier 97 has its direct current terminals connected, as at 102 and 103, in circuit with the armature winding of a shunt wound, direct current motor 104 to be driven, while the direct current terminals of rectifier 98 are connected, as at 105 and 106, with the pairs of reversed terminals 70 and 71 and 69 and 72. Terminals 67 and 68 of the switch are connected, as at 107 and 108, with the field winding 109 of the motor, to reverse the current supplied thereto and the direction of rotation of the motor. D. C. capacitors, of the electrolytic type, are preferably connected across the armature circuit of the driven motor, as at 110, and across its field circuit, as at 111, respectively, to control ripple and improve operation.

In operation, the pressure of the operator's toe against one end 33 of the control lever 29 tends to oscillate the lever in one direction from neutral position, thereby closing the input circuit and closing the circuit through the field winding of the motor to start and drive it in one direction. Continued oscillation of the control lever acts also to continuously and progressively increase the current supplied to the armature winding of the motor and decrease the current supplied to its field winding, so as to accelerate the motor to the desired speed of operation. On release of the control lever, the parts are returned to neutral position, opening the circuit and stopping the motor. Pressure of the operator's toe in the opposite direction against the control lever similarly closes the main or input switch to energize the controller but operates the reversing switch contacts in the opposite direction to reverse the direction of current through the field winding of the motor and drive it in the opposite direction, the transformer contact being moved in the same direction as before, however, to progressively accelerate the motor to the desired speed in the opposite direction.

A modified arrangement is shown in Fig. 16 in which the operating mechanism, the movable contact 41 and the transformer winding 112 are substantially the same, except that they are arranged in a position which is inverted from that described above, the casing 113 being somewhat modified to accommodate the inverted arrangement. The cylindrical wall of the casing is closed at its top by a cover plate 114 formed with a boss 115 provided with a bearing of insulating material in which the upper end of the spindle 45 is journaled. A tubular support 54, constructed of insulating material as in the first modification is fixed by screws to the cover plate 114 for further supporting the spindle 45 and for carrying the same switch means as in the first modification. Spindle 45 carries the same switch actuating cam disks 48 and 49 as before. The lower end of the spindle is journaled in a bearing 116 in a bottom plate 117 for closing and supporting the casing and its enclosed parts, this plate being fixed by means of screws (not shown) to shoulders 118 depending from the bottom of the cylindrical casing 113. The bottom of the casing, between these shoulders, is spaced above the bottom plate 117, as shown, leaving clearance openings 119 for the movement of the control member or lever 120. Lever 120 has the same construction as before, being fixed to the lower end of spindle 45 as by means of a screw 121, the operating ends 112 being turned upwardly and somewhat shorter so as to lie within convenient reach of the toe of the operator.

In the modification of Fig. 16, the mechanism connecting control member 120 with the movable contact 41 is the same as before, comprising abutments or rollers 123 on member 120 on opposite sides of its pivotal support on the spindle. These rollers are positioned for engagement with the same part or lever 83 pivoted at one end 84 on the same rack sector 85 secured as by means of screws 86 to the bottom of the cylindrical casing wall. The other end of lever 83 is connected by a link 87 with one arm of the bell crank lever 89 carrying the pinion 91 meshing on one side with the teeth of rack 85 and on the other with the sun gear 47, this gear being fixed to the arm 44 which carries the movable contact 41. The construction and operation of this mechanism is thus the same as described in connection with the first modification. This inverted arrangement, however, has the advantage that particles or dust worn from the movable carbon contact 41 or from the coils of the transformer by the contact therebetween, as well as dust from any other sources, tends to drop clear of the coil windings so as to avoid clogging them, interfering with good contact and possibly short-circuiting adjacent coils.

The invention provides an exceedingly simple and efficient controlling apparatus in which the speed of the driven machine is continuously variable by varying the ratio of transformation from alternating to direct current thereby eliminating the need for resistor, thyratron or other more complicated control means, as well as the attendant wastage of power. This system or mode of control is disclosed and claimed in my Letters Patent of the United States No. 2,462,249, dated February 22, 1949, for Electric Motor Control System, claiming the system herein disclosed but not herein claimed. The apparatus comprises a simple and compact controller of the portable type adapted to be conveniently moved on the floor to the desired position of use and having a single control member between the alternating current input and the direct current circuit of the motor to be driven, for conveniently starting, stopping, reversing and controlling the speed of the motor as desired.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A controller for an electric circuit comprising an elongated contact means and a contact movable to progressively engage said contact means, said controller comprising a control member movable in opposite directions, a stationary rack, gearing for connecting said rack and contact comprising a pinion meshing with said rack and a gear adapted for connection with said contact, and mechanism connecting said member and pinion for moving said pinion and said contact in the same direction during movement of said member in each of said opposite directions.

2. A controller for an electric circuit comprising an elongated contact means and a contact movable to progressively engage said contact means, said controller comprising a control member movable in opposite directions, a stationary rack, planetary gearing comprising a pinion meshing with said rack and a gear for connection with said contact, lever means for moving said pinion to move said contact, and a connection between said member and lever means for moving said lever means in the same direction during movement of said member in each of said opposite directions.

3. A controller for an electric circuit comprising an elongated contact means and a contact movable to progressively engage said contact means, said controller comprising a member pivoted intermediate its ends for movement in opposite directions, a part having a lateral movement toward and from the pivot of said member, a pair of abutments on said member on opposite sides of the pivot thereof for engaging and moving said part, and a means for connecting said part and said movable contact, for moving said contact in the same direction during movement of said member in each of said opposite directions.

4. A controller for an electric circuit comprising an elongated contact means and a contact movable to progressively engage said contact means, said controller comprising a member pivoted intermediate its ends for movement in opposite directions, a part pivoted adjacent one end at a point spaced from the pivot of said member for lateral movement toward and from said member pivot, an abutment on said member on each side of the pivot thereof for engagement with said part, said abutments being located at different distances from the pivot of said part, the abutment at the greater distance from the pivot of said part being at a greater distance from the pivot of said member for moving said part the same distance in the same direction during movement of said member in each of said opposite directions, and an actuating means for connecting said part and said movable contact.

5. A controller for an electric circuit comprising an elongated contact means and a contact movable to progressively engage said contact means, said controller comprising a member pivoted intermediate its ends for movement in opposite directions, a part pivoted adjacent one end at a point spaced from the pivot of said member for lateral movement toward and from said member pivot, an abutment on said member on each side of the pivot thereof for engagement with said part, said abutments being located at different distances from the pivot of said part, the abutment at the greater distance from the pivot of said part being at a greater distance from the pivot of said member for moving said part the same distance in the same direction during movement of said member in each of said opposite directions, and planetary gearing means for connecting said part and movable contact.

6. A controller for an electric circuit comprissing an elongated contact means and a contact movable to progressively engage said contact means, said controller comprising a member pivoted intermediate its ends for movement in opposite directions, a part pivoted adjacent one end at a point spaced from the pivot of said member for lateral movement toward and from said member pivot, an abutment on said member on each side of the pivot thereof for engagement with said part, said abutments being located at different distances from the pivot of said part, the abutment at the greater distance from the pivot of said part being at a greater distance from the pivot of said member, a stationary rack, a planetary gearing having an element meshing with said rack and an element for connection with said movable contact, and a connection between said part and gearing for moving said contact the same distance in the same direction during the movement of said member in each of said opposite directions.

7. A controller for an electric circuit comprising an arcuate contact means, a contact rotatable concentrically with said contact means for progressive engagement therewith, a member pivoted intermediate its ends concentrically with said rotary contact for rotation in opposite directions, a part having a lateral movement toward and from the pivot of said member, an abutment on said member on each side of the pivot thereof for moving said part, planetary gearing having its sun gear mounted concentrically and connected with said movable contact, and a connection between said part and gearing for moving said contact in the same direction during movements of said member in each of said opposite directions.

8. A controller for an electric circuit comprising an arcuate contact means, a contact rotatable concentrically with said contact means for progressive engagement therewith, a member pivoted intermediate its ends concentrically with said rotary contact for rotation in opposite directions, a part having a lateral movement toward and from the pivot of said member, an abutment on said member on each side of the pivot thereof for moving said part, a stationary rack, a planetary gear meshing with said rack and a sun gear concentric and connected with said movable contact, and a connection between said part and said planetary gear for moving said contact in the same direction during movement of said member in each of said opposite directions.

9. A controller for an electric circuit comprising an arcuate contact means, a contact rotatable concentrically with said contact means for progressive engagement therewith, a member having a pivotal mounting intermediate its ends concentric with said rotary contact for movement in opposite directions, a part movable laterally relative to the pivot of said member, gearing having an element mounted concentrically and connected with said rotary contact, actuating means connecting said part and gearing, and an abutment on each side of the pivot of said member for moving said part and rotating said contact in the same direction during movement of said member in each of said opposite directions.

10. A controller for an electric circuit comprising an arcuate contact means, a contact rotatable concentrically with said contact means for progressive engagement therewith, a control member pivoted intermediate its ends concentrically with said movable contact for movement in opposite directions, a part pivoted at one end at a point spaced from the pivot of said member for movement laterally relative thereto, an abutment on said member on each side of the pivot thereof for engaging said part, said abutments being located at different distances from the pivot of said part, the abutment at the greater distance from the pivot of said part being at a greater distance from the pivot of said member, for moving said part the same distance in the same direction during movement of said member in each of said opposite directions, a stationary arcuate rack, planetary gearing having an element meshing with said rack and an element mounted concentrically and connected with said movable contact, and an actuating connection between said part and said gearing.

11. A controller for an electric circuit comprising an arcuate contact means, a spindle mounted normally to the plane of said contact means for oscillation concentrically therewith, a contact rotatably mounted on said spindle for engagement progressively with said contact means, a control member fixed on said spindle, a part movable laterally relative to said spindle, an abutment on said member on each side of said spindle for moving said part in the same direction during oscillation of said member in opposite directions, gearing for actuating said rotatable contact and an actuating connection between said part and gearing.

12. A controller for an electric circuit comprising an arcuate contact means, a spindle mounted normally to the plane of said contact means for oscillation concentrically therewith, a contact mounted to rotate on said spindle for progressive engagement with said contact means, a control member fixed on said spindle, a part pivoted at one end at a point spaced from said spindle for lateral movement relative thereto, mechanism comprising gearing connecting said part and rotatable contact, and an abutment on said member on each side of said spindle for engagement with said part, said abutments being loctated at different distances from the pivot of said part, the abutment at the greater distance from the pivot of said part being spaced at a greater distance from said spindle than the other of said abutments, for moving said part and rotating said contact the same distance in the same direction during oscillation of said member in opposite directions.

13. A controller for an electric circuit comprising an arcuate contact means, a spindle mounted normally to the plane of said contact means for oscillation concentrically therewith, a contact mounted to rotate on said spindle for progressive engagement with said contact means, a control lever fixed intermediate its ends on said spindle, a part pivoted at one end at a point spaced from said spindle for movement laterally relative thereto, a stationary rack, planetary gearing having a gear mounted for rotation on said spindle and fixed to said contact, and a planet gear meshing with said rack, a linkage for rotating said planet gear connected with said part, and an abutment on said control lever on each side of said spindle for engaging said part, said abutments being located at different distances from the pivot of said part, the abutment at the greater distance from the pivot of said part being spaced at a greater distance from said spindle than the other of said abutments, for moving said part and rotating said contact the same distance in the same direction during oscillation of said control lever in oppostite directions.

EUGENE R. ZIEGLER.

REFERENCES CITED

The following references are of record in the file of this patent:

UNITED STATES PATENTS

| Number | Name | Date |
| --- | --- | --- |
| 653,725 | Woodward | July 17, 1900 |
| 673,911 | Lamme | May 14, 1901 |
| 675,293 | Pieper | May 28, 1901 |
| 738,870 | Wright et al. | Sept. 15, 1903 |
| 763,031 | Vance | June 21, 1904 |
| 806,735 | Carpenter | Dec. 5, 1905 |
| 969,055 | Hammond | Aug. 30, 1910 |
| 1,111,178 | Pieper | Sept. 22, 1914 |
| 1,460,161 | Lehr | June 26, 1923 |

FOREIGN PATENTS

| Number | Country | Date |
| --- | --- | --- |
| 459,217 | Germany | Apr. 30, 1928 |